(12) United States Patent
Dodson

(10) Patent No.: US 10,557,658 B2
(45) Date of Patent: *Feb. 11, 2020

(54) DUAL AUTO HYDRANT FOR SNOWMAKING GUN AND METHOD OF USING SAME

(71) Applicant: Snow Logic, Inc., Park City, UT (US)

(72) Inventor: Mitchell Joe Dodson, Park City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/716,166

(22) Filed: Sep. 26, 2017

(65) Prior Publication Data
US 2019/0154324 A1    May 23, 2019

Related U.S. Application Data

(63) Continuation of application No. 15/069,945, filed on Mar. 14, 2016, now Pat. No. 9,772,134.

(60) Provisional application No. 62/133,289, filed on Mar. 13, 2015.

(51) Int. Cl.
| F25C 3/04 | (2006.01) |
| F16K 11/07 | (2006.01) |
| F16K 31/54 | (2006.01) |
| E03B 9/02 | (2006.01) |
| E03B 9/14 | (2006.01) |
| B05B 7/12 | (2006.01) |
| B61C 17/02 | (2006.01) |

(52) U.S. Cl.
CPC ............... *F25C 3/04* (2013.01); *B05B 7/12* (2013.01); *B61C 17/02* (2013.01); *E03B 9/02* (2013.01); *E03B 9/14* (2013.01); *F16K 11/07* (2013.01); *F16K 11/0712* (2013.01); *F16K 31/54* (2013.01); *F25C 2303/0481* (2013.01)

(58) Field of Classification Search
CPC .......... F25C 3/04; F16K 11/07; F16K 11/072; F16K 31/54; E03B 9/02; E03B 9/14; B61C 17/02; B05B 7/12
USPC ..... 239/2.2, 14.2, 407, 417.5; 137/269, 272, 137/273, 282
See application file for complete search history.

(56) References Cited

U.S. PATENT DOCUMENTS

| 4,545,529 | A | * | 10/1985 | Tropeano | F25C 3/04 |
| | | | | | 239/14.2 |
| 5,031,832 | A | * | 7/1991 | Ratnik | F25C 3/04 |
| | | | | | 239/14.2 |
| 5,400,965 | A | * | 3/1995 | Ratnik | F25C 3/04 |
| | | | | | 239/14.2 |
| 5,718,378 | A | * | 2/1998 | Dupre | F25C 3/04 |
| | | | | | 239/14.2 |
| 5,749,517 | A | * | 5/1998 | Dupre | F25C 3/04 |
| | | | | | 239/14.2 |
| 6,805,150 | B1 | * | 10/2004 | Dion | F16K 11/07 |
| | | | | | 137/269 |
| 2011/0240756 | A1 | * | 10/2011 | Santry | F25C 3/04 |
| | | | | | 239/14.2 |
| 2012/0175428 | A1 | * | 7/2012 | Jouneau | F16K 11/07 |
| | | | | | 239/2.2 |

* cited by examiner

*Primary Examiner* — Steven J Ganey
(74) *Attorney, Agent, or Firm* — Paul C. Oestreich; Eminent IP, P.C.

(57) ABSTRACT

The invention is a dual auto hydrant configured to interface independent pressurized water and compressed air sources with snowmaking equipment, such as a snowmaking gun and methods of using same.

20 Claims, 16 Drawing Sheets

DUAL AUTO HYDRANT FOR SNOWMAKING GUN AND METHOD OF USING SAME

CROSS-REFERENCE TO RELATED APPLICATIONS

This US continuation patent application claims benefit and priority to non-provisional patent application Ser. No. 15/069,945, filed Mar. 14, 2016, titled "DUAL AUTO HYDRANT FOR SNOWMAKING EQUIPMENT AND METHOD OF USING SAME", issued as U.S. Pat. No. 9,772,134, on Sep. 26, 2017, which in turn claims benefit and priority to U.S. provisional patent application No. 62/133,289, filed on Mar. 13, 2015, titled "DUAL AUTO HYDRANT FOR SNOWMAKING EQUIPMENT AND METHOD OF USING SAME", now expired, the contents of both of which are incorporated by reference as if fully set forth herein.

BACKGROUND OF THE INVENTION

Field of the Invention

The present invention relates generally to systems and methods for snowmaking. More particularly, this invention relates to a hydrant used for selectively controlling delivery of water and compressed air to a snowmaking gun used to make artificial snow. Still more particularly, the dual auto hydrant of the present invention provides controlled charging and discharging of pressurized water and compressed air sources used by a snowmaking gun.

Description of Related Art

Snowmaking equipment is commonly used at ski resorts to supplement natural snowfall when needed to adequately cover ski slope terrain. Ski slope terrain without snow may be covered with dirt, surface plants, gravel, rocks and other debris that would otherwise prevent safe skiing or boarding on snow. Conventional snowmaking equipment may require sources of water, air and power.

Snowmaking equipment always requires a source of water from which snow may be created from atomized mists of water droplets that may or may not be seeded with nucleating ice crystals. Some snowmaking equipment requires electricity to run fans or operate equipment controls, data logging or other purposes. Still other snowmaking equipment may require a source of compressed air used to accelerate atomized mists of water droplets and optionally the nucleating ice crystals where used into the atmosphere so that the water droplets can freeze in the air before falling to the surface intended for the artificial snow. The more sophisticated state-of-the-art snowmaking equipment is capable of operating with pressurized water and compressed air alone to save on operating costs, for example the snowmaking equipment manufactured and sold by Snow Logic, Inc., Park City, Utah.

The water source used for snowmaking may be an underground pipeline that has been installed at one or more key locations on a ski slope for the specific purpose of snowmaking. Alternatively, a well, temporary surface pipeline, water hose, or any other suitable water source may be used for snowmaking. Typically, the water source must be pressurized to deliver it to a particular elevation and for use in pressurizing or charging the snowmaking gun. Similarly, the compressed air source may be a compressed air pipeline, air hose, air compressor or other suitable compressed air source located on the surface or underground and installed or located at the desired location for snowmaking equipment. Conventionally, the compressed air and pressurized water are separately supplied to snowmaking equipment and may or may not be provided at a single location for delivery to a snowmaking gun.

Accordingly, there exists a need in the art for a hydrant capable of safely providing pressurized water and compressed air to a snowmaking gun.

SUMMARY OF THE INVENTION

Embodiments of the invention include a dual auto hydrant and method of using same. General embodiments of hydrant and method are summarized here.

An embodiment of a dual auto hydrant for selectively supplying compressed air and water to a snowmaking gun is disclosed. The embodiment of a hydrant may include a hydrant base having an outer surface with a bottom end and a top end, a cylinder oriented along an axis from the bottom end to the top end. The embodiment of a hydrant base may further include a water inlet port passing between the outer surface and the cylinder. The embodiment of a hydrant base may further include a water outlet port passing between the outer surface and the cylinder. The embodiment of a hydrant base may further include a compressed air inlet port passing between the outer surface and the cylinder. The embodiment of a hydrant base may further include a compressed air outlet port passing between the outer surface and the cylinder. The embodiment of a hydrant base may further include a compressed air drain passing between the outer surface and the cylinder. The embodiment of a dual auto hydrant may further include a piston having a distal end and proximal end, the piston passing through the cylinder, the piston further comprising a plurality of seals formed circumferentially around the piston at selected locations along a length of the piston. The embodiment of a dual auto hydrant may further include a controller housing coupled to the hydrant base. The embodiment of a dual auto hydrant may further include a rack and pinion mechanism disposed inside the controller housing and coupled to the proximal end of the piston. The embodiment of a dual auto hydrant may further include a hydrant control lever coupled to the rack and pinion mechanism to selectively drive the piston to any one of three operating positions, hydrant closed position, hydrant air open water closed position and hydrant air open water open position, in that order or reverse order.

An embodiment of a method for selectively providing water and compressed air to a snowmaking gun is disclosed. The method may include the step of providing a dual auto hydrant configured for placement between the snowmaking gun and sources of water and compressed air, the hydrant having three operating positions, a hydrant closed position, a hydrant air open water closed position and a hydrant air open water open position. The method may further include the step of selecting the hydrant closed position to shut off a compressed air channel between the compressed air inlet and the compressed air outlet, drain compressed air from the compressed air channel and shut off a water channel between the water inlet and the water outlet with a water drain open to drain water from the water channel. The method may further include the step of selecting the hydrant air open water closed position to open the compressed air channel between the compressed air inlet and the compressed air outlet, close the compressed air drain, shut off the water channel between the water inlet and the water outlet and close the water drain. The method may further include the step of selecting the hydrant air open water open position to open the compressed air channel between the compressed air inlet and the compressed air outlet, close the compressed air drain, open the water channel between the water inlet and the water outlet and close the water drain.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

The following drawings illustrate exemplary embodiments for carrying out the invention. Like reference numerals refer to like parts in different views or embodiments of the present invention in the drawings.

DETAILED DESCRIPTION

Figure 1A:
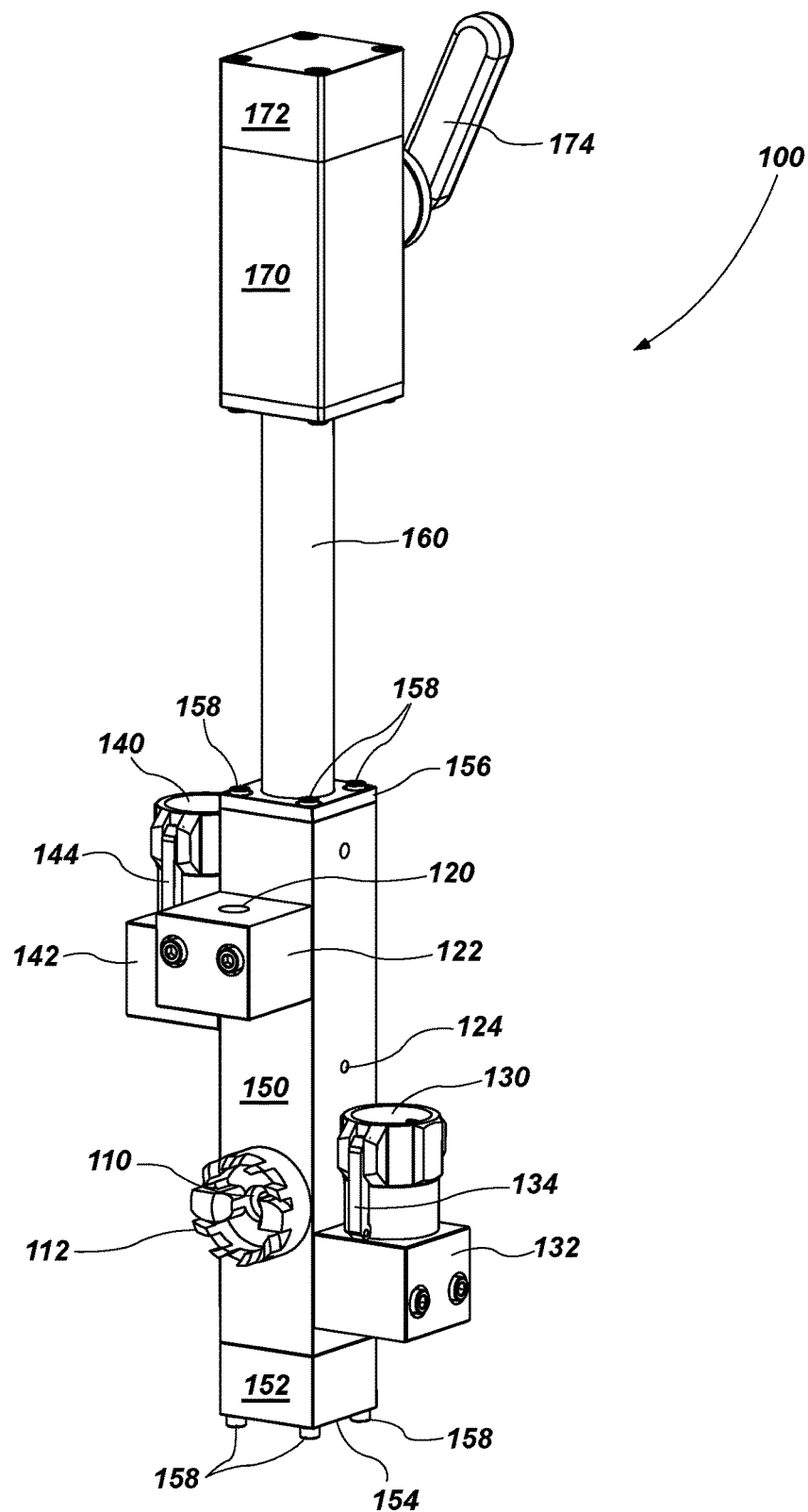
FIGS. 1A-1G are perspective, front, rear, right side, left side, top and bottom views, respectively, of a dual auto hydrant according to an embodiment of the present invention.
Figure 1B:
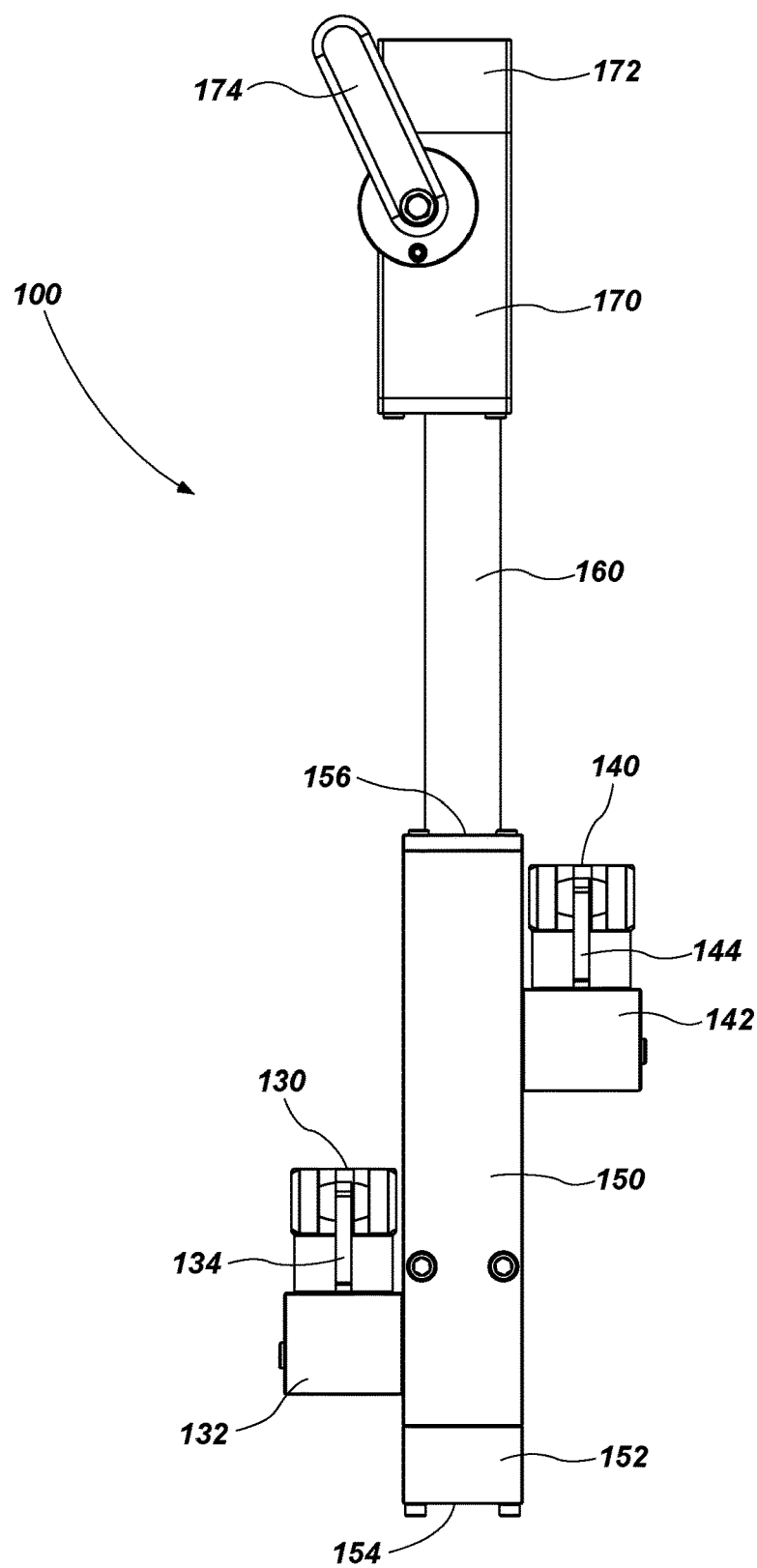
Figure 1C:
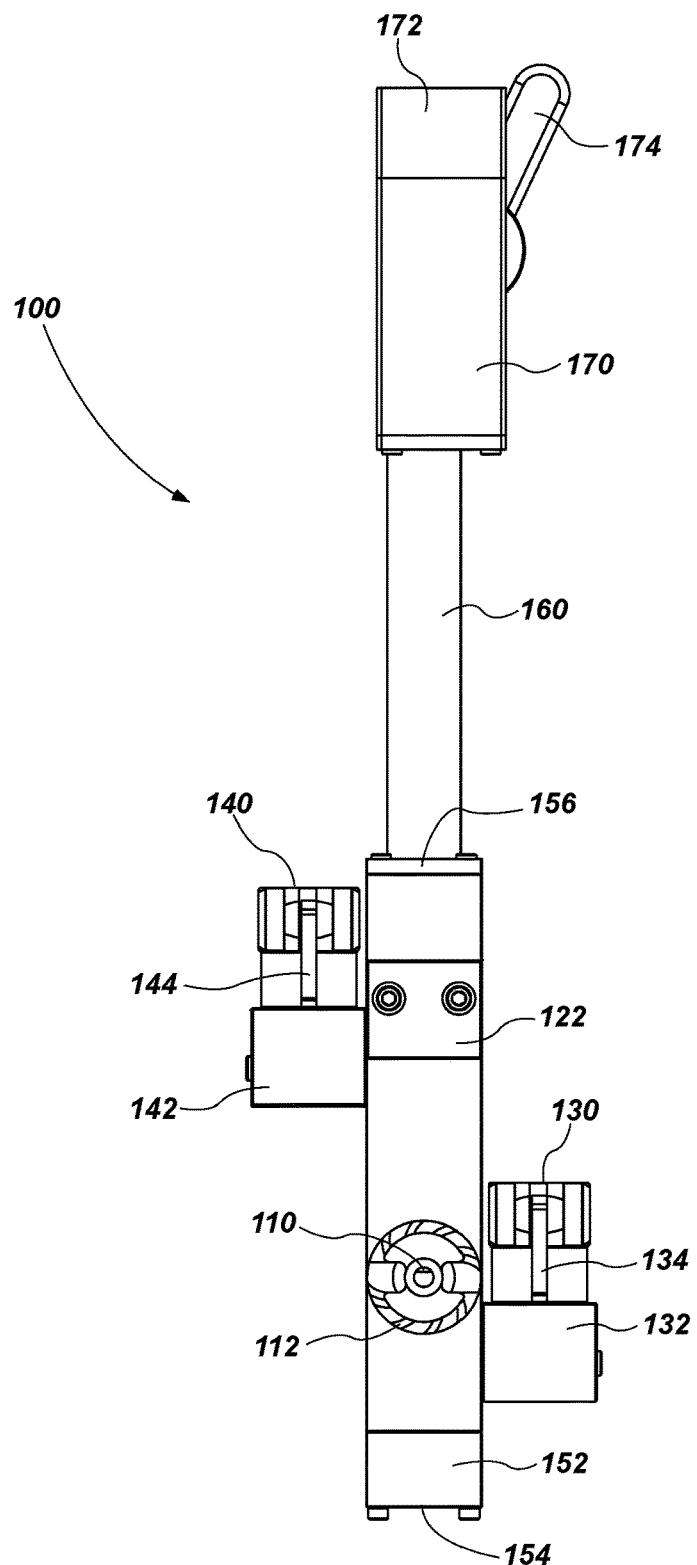
Figure 1D:
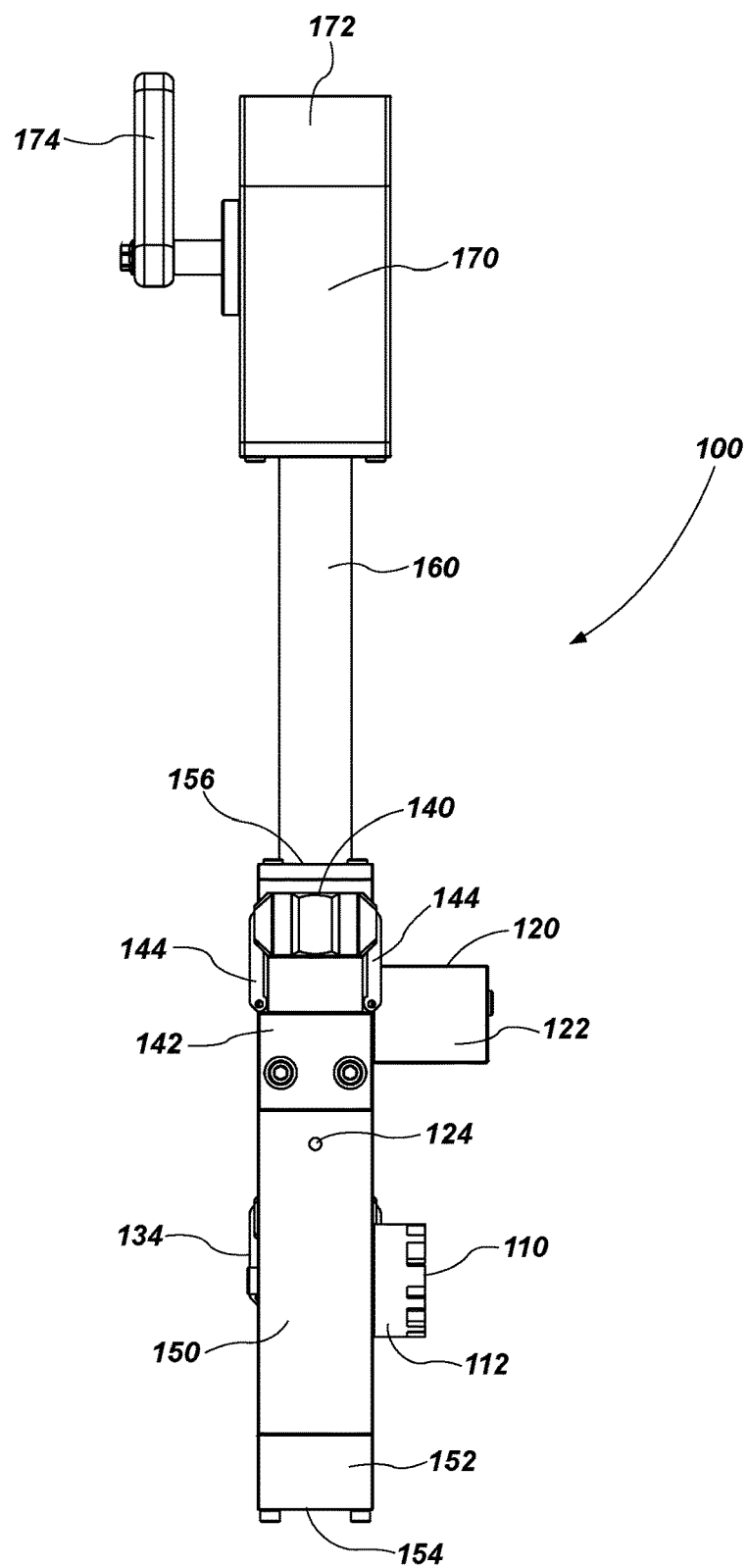
Figure 1E:
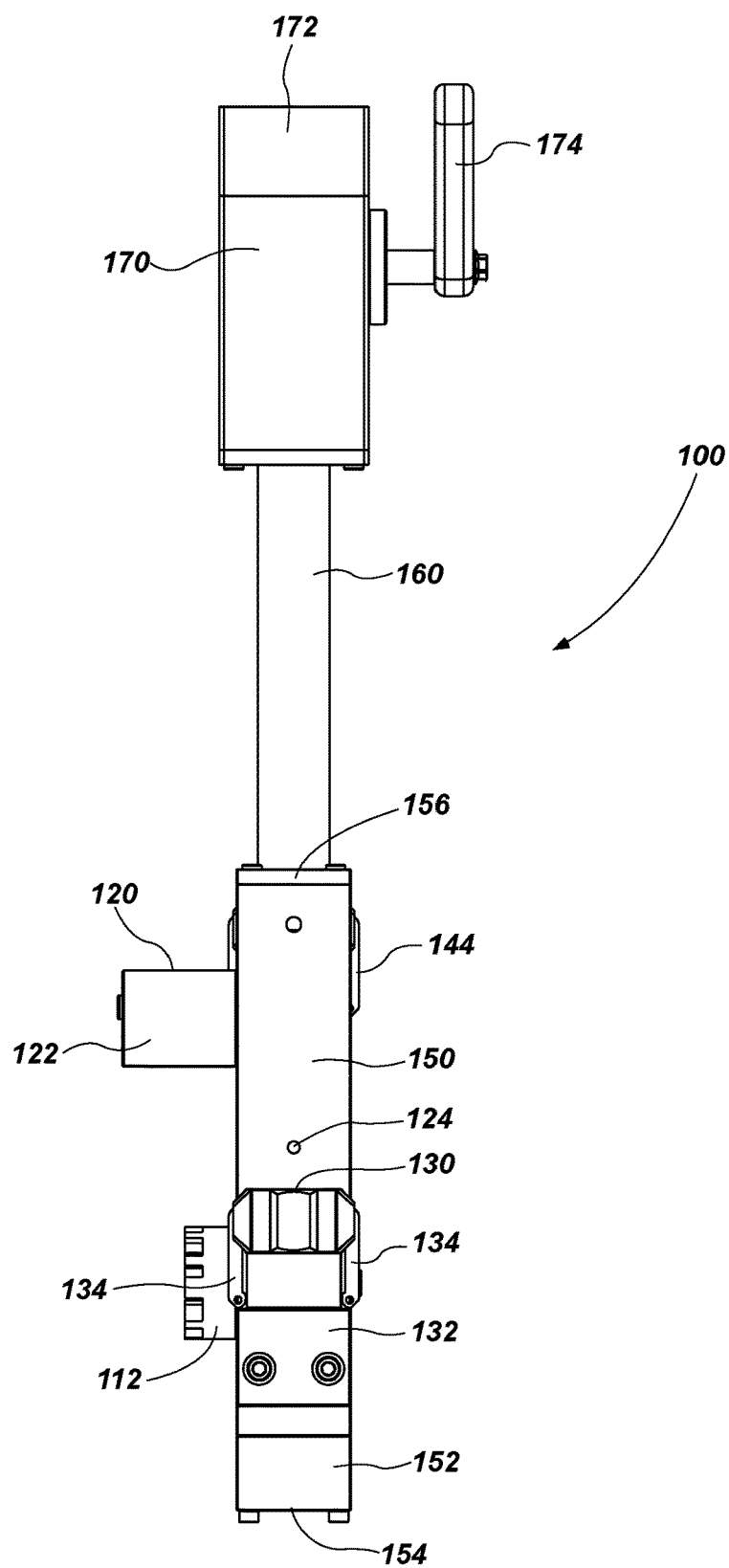
Figure 1F:
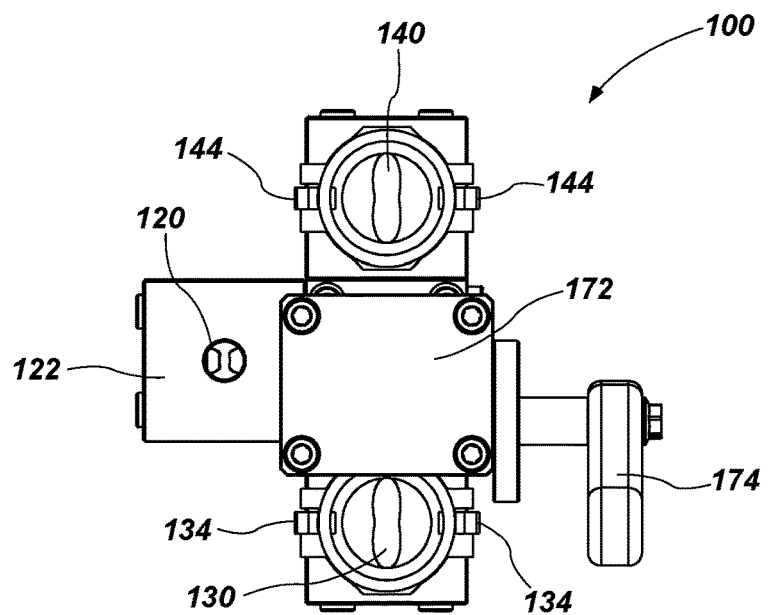

The invention is a dual auto hydrant configured to interface pressurized water and compressed air sources with snowmaking equipment and methods of using same. One particularly useful feature of the dual auto hydrant disclosed herein is the ability charge the gun with compressed air prior to adding pressurized water. Conversely, when shutting off the snowmaking gun, the pressurized water within the hydrant may be turned off first, followed by the compressed air. When the hydrant is off, all pressurized air is allowed to escape and water in the hydrant is allowed to drain out under the force of gravity. A novel water pipeline tap that generates a whirling vortex from the water source and a novel moisture separating filter used to prevent water vapor from entering the compressed air inlet of the hydrant are two additional features of the various embodiments of the present invention.

Referring now to FIGS. 1A-1G, various views of an embodiment of a dual auto hydrant 100 are illustrated. More particularly, FIGS. 1A-1G illustrate perspective, front, rear, right side, left side, top and bottom views of an embodiment of the dual auto hydrant 100. The dual auto hydrant 100 is configured to selectively deliver water and compressed air to a snowmaking gun (not shown) used to make artificial snow. As shown in FIGS. 1A-1G, dual auto hydrant may include a hydrant base 150 with a top end 156 and a hydrant base cap 152 and the bottom end 154. The hydrant base cap 152 and/or bottom end 154 may be secured to the hydrant base 150 with a plurality of bolts 158 (six bolt heads shown, two bolt heads not visible in FIG. 1A) installed in appropriate receptacles (i.e., bolt holes not shown) with or without seals (not shown). The hydrant base cap 152 and/or bottom end 154 each may provide access to the internal components of the dual auto hydrant 100. According to the illustrated embodiment, a water inlet port 110 may be formed in the hydrant base 150 with an associated water pipeline tap 112 attached to the hydrant base 150. A unique feature associated with the water pipeline tap 112 is the fixed turbine intake blades 702 (see FIGS. 7A-G and discussion below) that help prevent water from freezing as it enters the dual auto hydrant 100.

The hydrant base 150 may also include a water outlet port 130 emanating from a water outlet port fixture 132 attached to the hydrant base 150, according to the illustrated embodiment of the dual auto hydrant 100 shown in FIGS. 1A-1G. The water outlet port 130 is configured for attachment to a fitting (not shown) on the end of a water hose (also not show) that attaches to the snow gun (also not shown). The water outlet port 130 may further include a water hose clamp lever 134, as shown in the illustrated embodiment, or other mechanism, such as threaded cap (not shown) for securing the end of a water hose (not show) between the dual auto hydrant 100 and the snow gun (not shown). It will be understood that various means for connecting a water source hose to the dual auto hydrant 100 will be readily apparent and within the knowledge of one of ordinary skill in the art, and thus, will not be further elaborated herein.

Figure 1G:
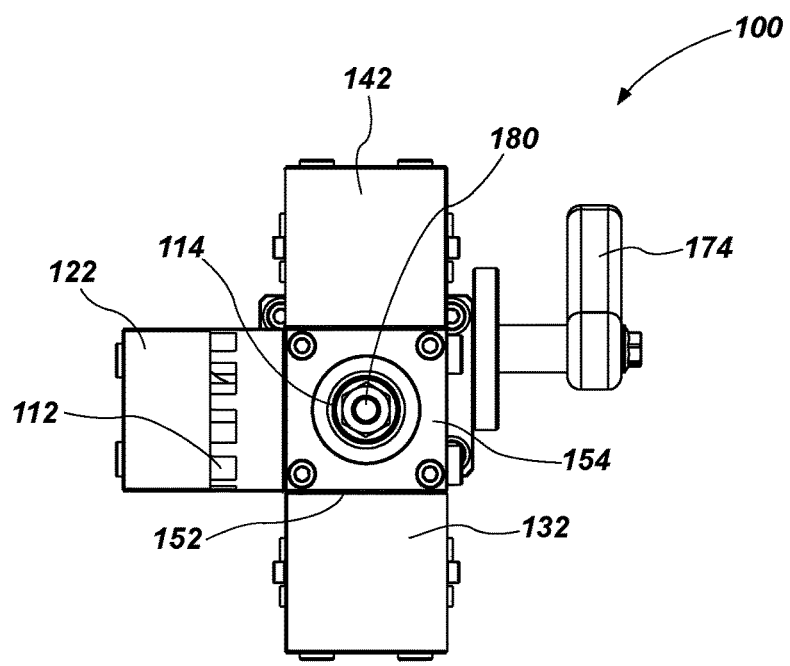

The hydrant base 150 may be configured to enclose a piston (not shown in FIGS. 1A-1G, but see 180 in FIGS. 6A-6D) with a plurality of seals (not shown in FIGS. 1A-1G, but see 680 in FIGS. 6A-6D). The piston 180 with its O-ring seals 680 may be configured to move longitudinally along its axis 690 within a cylinder (see, e.g., 340 FIGS. 3A-3C) formed in the hydrant base 150. Movement of the piston 180 within the cylinder 340 selectively allows opening and closing of an independent compressed air channel between the compressed air inlet port 120 and the compressed air outlet port 140. The piston 180 (partially shown in FIG. 1G) with its plurality of seals 680 (again, not shown) also selectively allows opening and closing of an independent water channel between the water inlet port 110 and the water outlet port 130. FIG. 1G also illustrates an exemplary water drain 114 which is formed by the piston 180 and one of its plurality of seals 680 (not shown) against the cylinder 340 (see further discussion below) of hydrant base 150.

The dual auto hydrant 100 may further include a compressed air inlet fixture 122 secured to the hydrant base 150, as shown in the illustrated embodiment. The compressed air inlet fixture 122 may further include a compressed air inlet port 120 configured for receiving compressed air from a compressed air line (not shown) which may in turn be connected to a source of compressed air, e.g., a compressed air hose, air pipeline or compressor (none shown), according to various embodiments. The dual auto hydrant 100 may further include at least one compressed air drain 124 (e.g., one drain 124 shown in FIG. 1A). The compressed air drain 124 allows pressurized air in a compressed air channel (not shown inside the hydrant base 150) to vent when the dual auto hydrant 100 is in the hydrant closed position, i.e., compressed air inlet closed.

According to one embodiment, the dual auto hydrant 100 may further include a controller housing 170 with a controller housing cap 172 and hydrant control lever 172. According to one embodiment, the control lever 172 actuates a rack and pinion mechanism within the controller housing 170 that is coupled to the piston 180 in the hydrant base 150. As shown in FIGS. 1A-1D, the dual auto hydrant 100 may further include an optional control rod housing 160 disposed between the controller housing 170 and the top end 156 of the hydrant base 150. The control rod housing 160 houses a control rod (not shown, but discussed below) that may be coupled between the rack and pinion mechanism (not shown, within the controller housing 170) and the piston 180 (not shown, but see FIGS. 6A-6D below) inside the hydrant base 150. The control rod housing 160 and its internal control rod (not shown) may be any suitable length for user operation of the hydrant control lever 174 to actuate the piston 180. The purpose of the controller housing 170 and it hydrant control lever 172 is to allow manual control and actuation of the piston 180 and its associated valves for allowing compressed air and water into and out of the hydrant base 150.

As known to those of skill in the art, snowmaking guns generally require water and compressed air to form snow in the appropriate ambient conditions. So, for example, a ski resort may install a water pipeline to a particular location on a ski hill that snowmaking is desired. Similarly, a compressed air line or suitable air compressor(s) with the appropriate electrical power may also be delivered to the same particular location for use by snowmaking equipment. The dual auto hydrant 100 of the present invention is used to conveniently provide and control access to such water and compressed air sources at a single location on the mountain slope.

Figure 2:
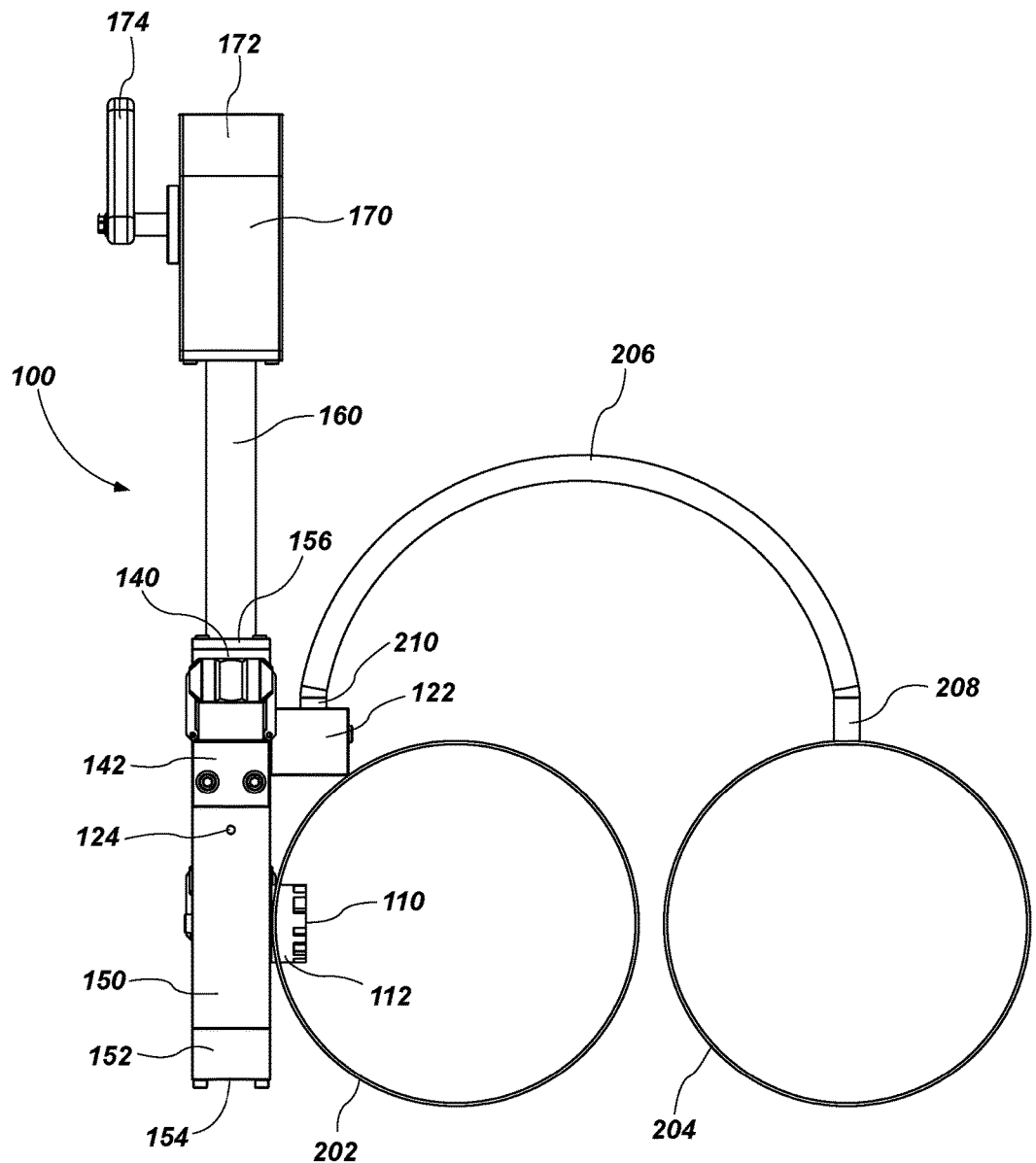
FIG. 2 illustrates a schematic of an embodiment of a dual auto hydrant consistent with the present invention connected to water and compressed air sources.

FIG. 2 illustrates a schematic diagram of an embodiment of a dual auto hydrant 100 of the present invention connected to water and compressed air sources. More particularly, the exemplary water source is a water pipeline 202 and the exemplary compressed air source is a compressed air pipeline 204. The water pipeline tap 112 may be welded or otherwise permanently affixed to the water pipeline 202 and then may be connected to the hydrant base 150 using any suitable means, e.g., bolted with appropriate seals and mounting hardware. The particular shape of the fixed turbine intake blades 702 extending from the water pipeline tap 112 are used to statically create a whirling vortex of the incoming water to help prevent freezing at that interface between the water pipeline 202 and the dual auto hydrant 100. Further aspects and features of the water pipeline tap 112 are discussed below with reference to FIGS. 7A-7G.

FIG. 2 further illustrates an exemplary compressed air hose 206 that may be attached to the compressed air pipeline 204 using a suitable air hose pipeline fixture 208 to deliver compressed air to the compressed air inlet fixture 122 (and its compressed air inlet port 120) using a suitable air hose inlet fixture 210. The only additional equipment not shown in FIG. 2, but necessary to make snow, would be a snowmaking gun connected to the compressed air outlet port fixture 142 and water outlet port fixture 132 using appropriate hoses (also not shown).

In order to illustrate the operation of the unique valving and control of the compressed air and pressurized water performed by the dual auto hydrant 100, three sets of drawings will be used to illustrate the three possible modes of operation for the dual auto hydrant 100. More particularly, FIGS. 3A-C and related discussion below are used to illustrate the dual auto hydrant 100 in the first position, namely, air closed and water closed position, which means that any attached snowmaking gun is turned off. Likewise, FIGS. 4A-4C and related discussion below are used to illustrate the dual auto hydrant 100 in the second position, namely, air open and water closed position, which is an intermediate position that allows air only to pass through an attached snowmaking gun. Finally, FIGS. 5A-4C and related discussion below are used to illustrate the dual auto hydrant 100 in the third position, namely, air open and water open position which is when an attached snowmaking gun is making snow. It should be noted that the drawing FIGS. 3A-3C, 4A-4C and 5A-5C are all illustrated with external conduits (ports, taps, fixtures, etc.) removed to better illustrate the inner workings of the piston 180 inside the cylinder 340 and for simplicity of illustration.

Figures 3A, 3B, 3C:
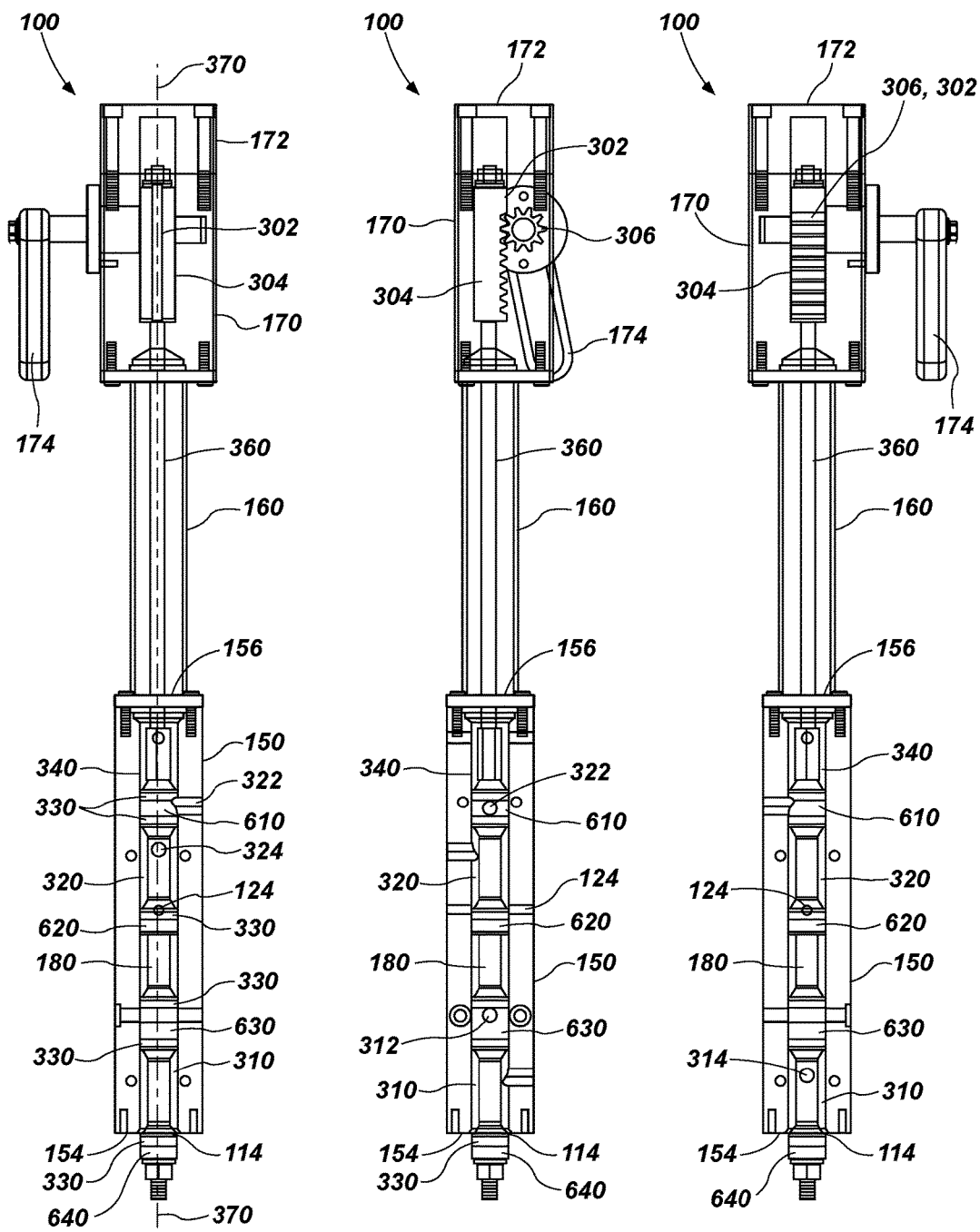
FIGS. 3A-3C are left side, rear, and right side views, respectively, of an embodiment of a dual auto hydrant shown in x-ray or see-through to illustrate the internal operation of the hydrant in a first or closed position, namely the air closed water closed position in accordance with the present invention.

FIGS. 3A-3C are left side, rear, and right side views, respectively, of an embodiment of the dual auto hydrant shown in x-ray or see-through to illustrate the internal operation of the dual auto hydrant 100 in the first or closed position in accordance with the present invention. When the dual auto hydrant 100 is in the first position, namely, air closed and water closed position, no air or water is being delivered to any attached snowmaking gun. FIGS. 3A-3C also illustrate additional components and features of the present invention that are internal to the hydrant base 150, control rod housing 160 and controller housing 170.

More particularly, FIG. 3B best illustrates the rack and pinion mechanism 302. As shown in FIG. 3B, a rack 304 is connected longitudinally to a control rod 360 and driven up and down by rotation of hydrant control lever 174. Rotation of the hydrant control lever rotates pinion gear 306 whose teeth engage rack 304. As known to those skilled in the art, the pinion gear 306 teeth mesh with slotted grooves in rack 304 in order to move the control rod 360 up and down under rotational movement of the pinion gear teeth against the rack teeth.

The control rod 360 is also coupled to the piston 180 along a longitudinal axis 370 passing through rod 360, piston 180 and rack 304. Circumferential seals 330, for example and not by way of limitation, may be O-rings (see O-rings 680, FIGS. 6A-D) of an appropriate size and composition and may be selectively placed along the piston shaft and configured to seal the piston 180 against the inner surface of the cylinder 340 disposed inside the cylinder 340 with hydrant base 150. According to one embodiment, cylinder 340 may extend through the length of the hydrant base 150 from the bottom end 154 to the top end 156. Cylinder 340 may be of any suitable diameter consistent with the outside diameter of piston 180 and its associated seals 330 (or O-rings 680).

The selective placement of the plurality of seals 330 (six shown for each piston 180) and reduced diameter sections of the piston 180 form a compressed air channel 320 and a water channel 310. Channels 310 and 320 are selectively charged and discharged under longitudinal movement of the piston 180 under control of the hydrant control lever 174 and its associated rack and pinion mechanism.

Figure 6A:
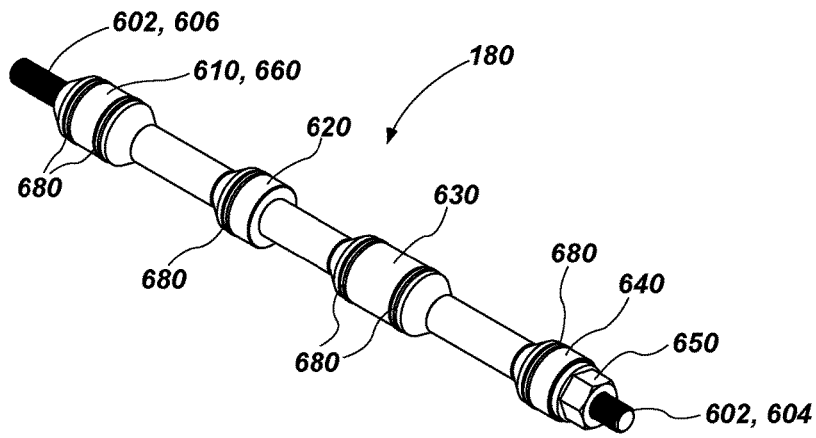
FIGS. 6A-6D are perspective, front, section and detail views of an embodiment of a piston for use with embodiments of a dual auto hydrant according to the present invention.
Figure 6B:
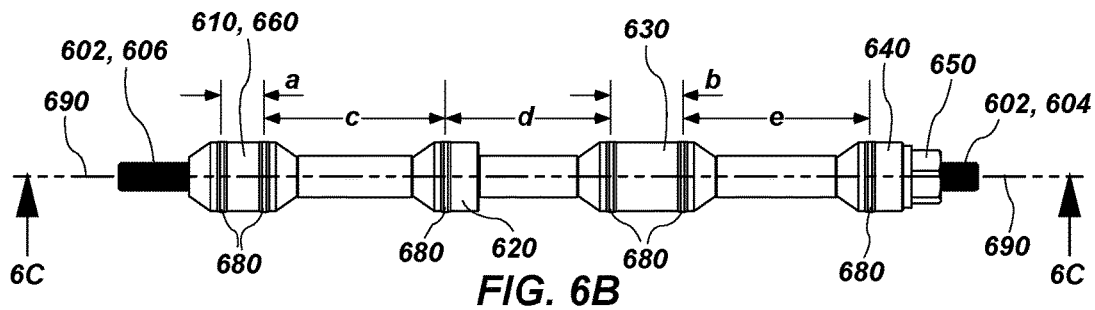

More particularly, the compressed air channel 320 is bounded by the region defined by the reduced diameter piston 180 and the cylinder 340 between the compressed air inlet stack 610 and the compressed air drain stack 620 (see distance, c, FIG. 6B). Passages into and out of the compressed air channel 320 include: the compressed air inlet 322, the compressed air outlet 324 and the compressed air drain 124, all of which are openings on the inside of the cylinder 340 that pass through to external conduits or atmosphere (e.g., compressed air drain 124) on the surface of hydrant base 150.

Similarly, the water channel 310 is bounded by the region defined by the reduced diameter piston 180 and the cylinder 340 between the water inlet stack 630 and the water drain stack 640 (see distance, e, FIG. 6B). Passages into and out of the water channel 310 include: the water inlet 312, the water outlet 314 and the water drain 114. The water inlet 312 and water outlet 314 are openings on the inside of the cylinder 340 that pass through to external conduits on the surface of hydrant base 150. Water drain 114 is opened by the seal 330 on the water drain stack 640 passing below the cylinder 340 opening at the hydrant base bottom end 154 (first position only). In the first position, water simply drains out the water drain 114 due to gravity. In the second and third positions, the water drain 114 is effectively closed and water does not drain out water drain 114.

In the hydrant closed (first) position illustrated in FIGS. 3A-3C, compressed air inlet 322 is sealed off from the compressed air channel 320 by two seals 330 on the compressed air inlet stack 610 of piston 180. Furthermore, in the first position the compressed air outlet 324 and open compressed air drain 124 are in fluid connection with the compressed air channel 320. In this hydrant closed (first) position, any compressed air that might have been in the compressed air channel 320 is allowed to escape out of the compressed air drain 124 or the compressed air outlet 324 and air pressure inside the compressed air channel 320 has equalized to atmospheric pressure. Similarly in the first position, water inlet 312 is sealed off from the water channel 310 by two other seals 330. In this first position the water outlet 314 and open water drain 114 are in fluid communication with water channel 310. Thus, in the hydrant closed (first) position, any water that was in the water channel 310 will drain out of the water drain 114 under gravitational force. It is important to drain out water from the hydrant 100 when not in use so that water does not freeze inside the hydrant 100.

Figures 4A, 4B, 4C:
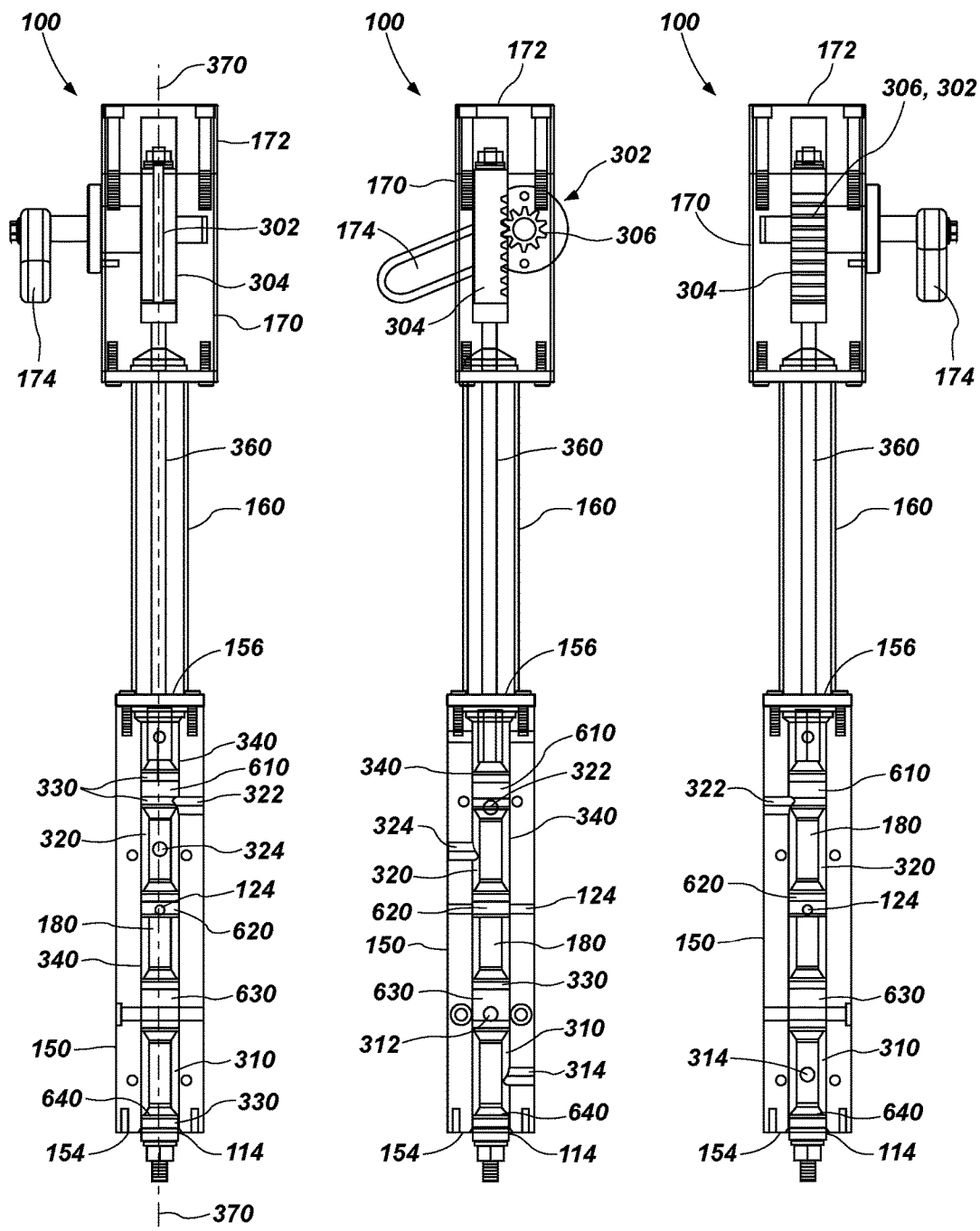
FIGS. 4A-4C are left side, rear, and right side views, respectively, of an embodiment of a dual auto hydrant shown in x-ray or see-through to illustrate the internal operation of the hydrant in a second position, namely the air open water closed position in accordance with the present invention.

FIGS. 4A-4C are left side, rear, and right side views, respectively, of an embodiment of the dual auto hydrant shown in x-ray, or see-through, to illustrate the internal operation of the dual auto hydrant 100 in the second position, namely the air open water closed position in accordance with the present invention. When the dual auto hydrant 100 is in the second position, namely, air open and water closed position, no water is being delivered to any attached snowmaking gun (not shown). FIGS. 4A-4C also illustrate components and positional features of the present invention that are internal to the hydrant base 150, control rod housing 160 and controller housing 170.

As can be seen by comparing the relative positions of the rack 304, control rod 360 and piston 180 relative to the first position illustrated in FIGS. 3A-3C, the second position finds all three of those components, pulled up further with the cylinder 340, due to rotation of the pinion gear 306 relative to the rack 304 teeth using hydrant control lever 174. In this second position the water inlet 312 is still in the closed position, but now the water drain 114 has also closed. The water drain 114 in the closed position is formed by the bottommost seal 330 of piston 180 sealed against the cylinder 340 near the hydrant base bottom end 154. Thus in the second position, compressed air is allowed into the dual auto hydrant 100 through the compressed air inlet port 120 and is vented through the compressed air outlet 324 with the compressed air drain 124 closed. The second position is an intermediate position prior to charging an attached snowmaking gun (not shown) with water that allows the compressed air to vent both the hydrant 100 and an attached snowmaking gun (again not shown).

Figures 5A, 5B, 5C:
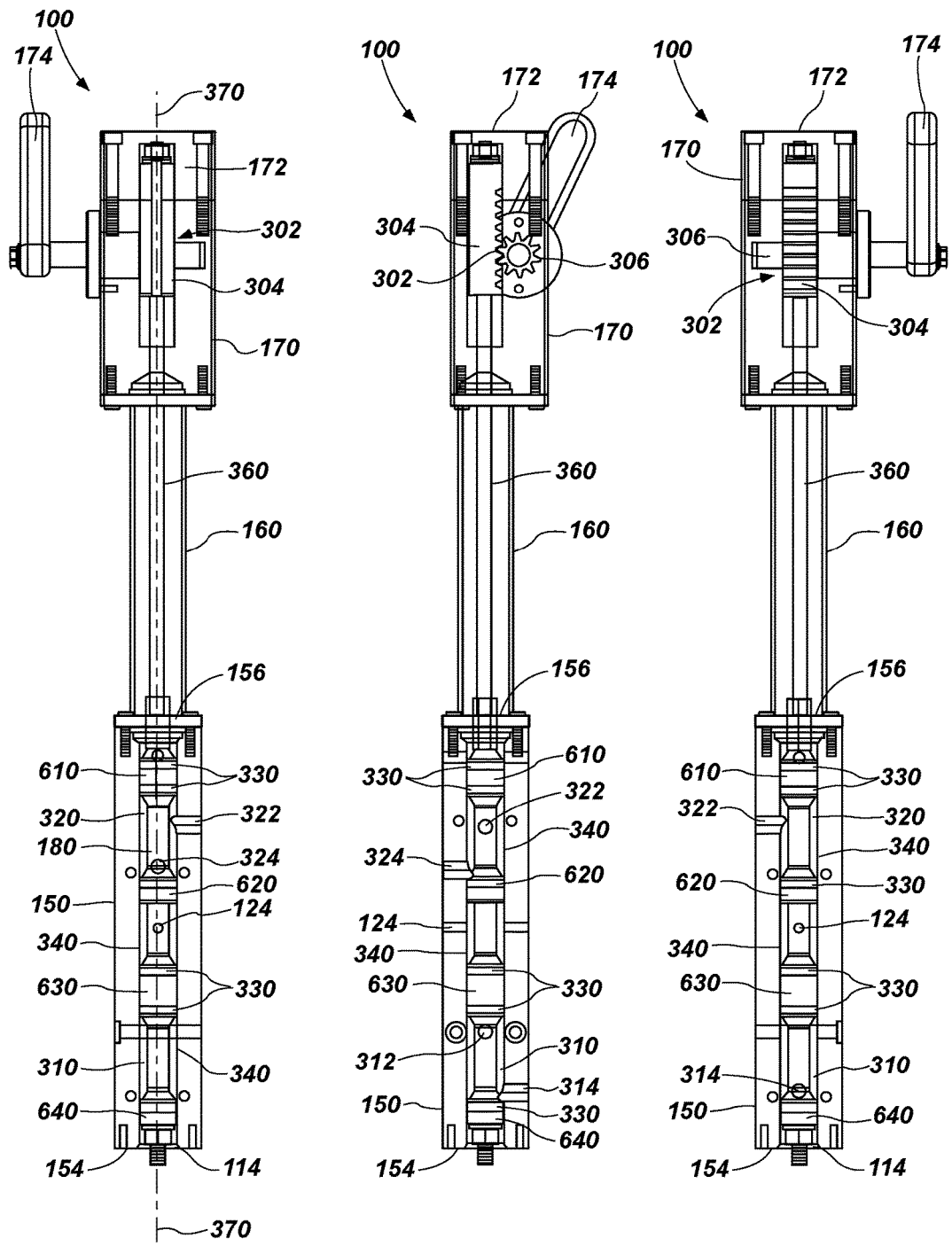
FIGS. 5A-5C are left side, rear, and right side views, respectively, of an embodiment of the dual auto hydrant shown in x-ray or see-through to illustrate the internal operation of the hydrant in a third position, namely the air open water open position in accordance with the present invention.

The third position is illustrated in FIGS. 5A-5C where the dual auto hydrant 100 is fully open, i.e., both compressed air and pressurized water are being delivered to the hydrant's respective air and water outlets. More specifically, FIGS. 5A-5C are left side, rear, and right side views, respectively, of an embodiment of the dual auto hydrant 100 shown in x-ray or see-through to illustrate the internal operation of the hydrant air open water open (third) position in accordance with the present invention.

As can be seen in FIGS. 5A-5C by comparing the relative positions of the rack 304, control rod 360 and piston 180 relative to the first and second positions illustrated in FIGS. 3A-3C and 4A-4C, respectively, the third position finds all three of those components, pulled further up within the cylinder 340, due to further rotation of the pinion gear 306 relative to the rack 304 teeth using hydrant control lever 174. In the third position, nothing changes with respect to the compressed air valving relative to the second position. The change that occurs is that pressurized water is introduced through the water inlet 312 and allowed to pass out through the water outlet 314 with the water drain remaining closed. Thus, the third position is the proper operating position for snowmaking as both air and water are capable of being delivered to an attached snowmaking gun (not shown).

Table 1, below, summarizes the respective inlet, outlet, drain conditions for each of the three possible dual auto hydrant operating positions.

TABLE 1

| Hydrant | Air Inlet | Air Outlet | Air Drain | Water Inlet | Water Outlet | Water Drain |
|---|---|---|---|---|---|---|
| Position | 322 | 324 | 124 | 312 | 314 | 114 |
| First - Off | Closed | Open | Open | Closed | Open | Open |
| Second - Air Only | Open | Open | Closed | Closed | Open | Closed |
| Third - Air and Water | Open | Open | Closed | Open | Open | Closed |

Referring now to FIGS. 6A-6D, perspective front, section and detail views of an embodiment of a piston 180 for use with embodiments of a dual auto hydrant 100 are shown according to the present invention. The embodiment of piston 180 illustrated n FIGS. 6A-6D may include a piston rod 602 having threading on a bottom end 604 and on a top end 606. Piston 180 may further include a compressed air inlet stack 610, a compressed air drain stack 620, a water inlet stack 630, a water outlet stack 640 and a locking nut 650.

More particularly, the illustrated embodiment of a compressed air inlet stack 610 may have a cylindrical air inlet cut-off region 660 located between two O-ring seals 680, separated by distance, a. Distance, a, (FIG. 6B) between the two O-ring seals 680, defines the extent to which the piston 180 can move along piston axis 690 while the compressed air inlet 322 (FIG. 3B) is shut off and no compressed air will enter the dual auto hydrant 100 (not shown in FIGS, 6A-6D) or an attached snowmaking gun (not shown). Note that when the piston 180 is installed within the cylinder 340 inside hydrant base 150, the longitudinal axis 370 (FIG. 3A) is coaxial with piston axis 690.

Figure 6C:
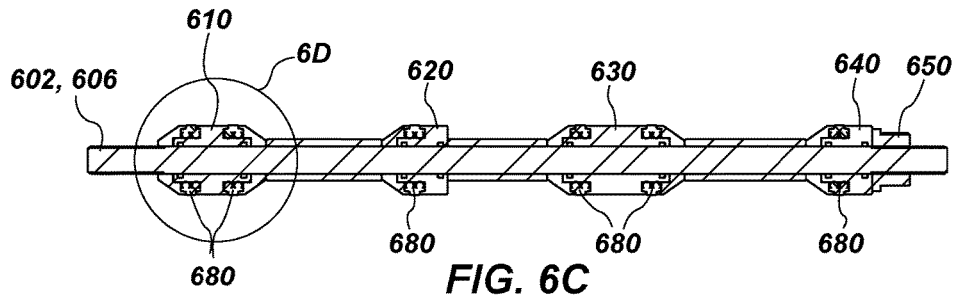
Figure 6D:
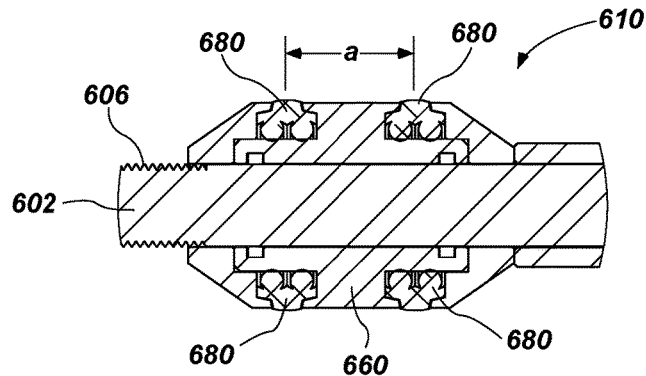

The compressed air drain stack 620 may have a single O-ring seal 680 as shown in the embodiment illustrated in FIGS. 6A-6C. The distance, c, (FIG. 6B) between the lowest O-ring 680 on the compressed air inlet stack 610 and the O-ring 680 on the compressed air drain stack 620 defines the region in which the compressed air outlet 324 (FIGS. 3A, 4A and 5A) is open to the compressed air outlet port 140 in the compressed air inlet fixture 142. For all positions of the piston 180 along its axis 690, the compressed air outlet 324 is open to the compressed air outlet port 140 in compressed air inlet fixture 142. The distance, d, (FIG. 6B) between the O-ring 680 on the compressed air drain stack 620 and the top O-ring 680 of the water inlet stack 630 defines a region wherein the compressed air drain 124 is closed.

The water inlet stack 630 may have a cylindrical water inlet cut-off region 670 located between two O-ring seals 680, separated by distance, b (FIG. 6B). Distance, b, between the two O-rings seals 680, defines the extent to which the piston 180 can move along its axis 690 while the pressurized water inlet 312 (see, FIGS. 3B and 4B) is shut off and no water will enter the dual auto hydrant 100 (not shown in FIGS, 6A-6D) or an attached snowmaking gun (not shown).

The water outlet stack 640 may have a single O-ring seal 680 as shown in the embodiment illustrated in FIGS. 6A-6C. The distance, e, (FIG. 6B) between the lowest O-ring 680 on the water inlet stack 630 and the O-ring on the water outlet stack 640 defines the region in which the water outlet 314 (FIGS. 3C, 4C and 5C) is open to the water outlet port 130 of the water outlet port fixture 132. For all positions of the piston 180 along its axis 690, the water outlet 314 is open to the water outlet port 130 of the water outlet port fixture 132.

FIGS. 7A-7G are various views of an embodiment of a water pipeline tap 112 for use with embodiments of a dual auto hydrant 100 according to the present invention. According to the illustrated embodiment, the water pipeline tap 112 may include a plurality of mounting holes 706 (two shown in FIGS. 7A and 7D-E). According to one embodiment, the mounting holes 706 may be threaded for receiving a bolt (not shown) used to secure the water pipeline tap 112 to the hydrant base 150. According to another embodiment (not illustrated), the mounting holes 706 may pass entirely through the two support members 708. An important feature of the water pipeline tap 112 is the plurality of fixed turbine intake blades 702 surrounding the tap inlet 710. Though there are eight fixed turbine intake blades 702 shown in the illustrated embodiment of water pipeline tap 112, it will be understood that any suitable number of fixed turbine intake blades 702 could be arranged around the tap inlet 710. The purpose of the fixed turbine intake blades 702 is to automatically generate a swirling vortex, see circular arrows 704 in FIG. 7C, within the pressurized water flowing into the dual auto hydrant 100 (not shown in FIGS. 7A-G).

Figure 7A:
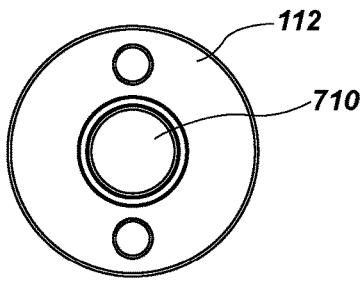
FIGS. 7A-7G are various views of a water pipeline tap for use with embodiments of a dual auto hydrant according to the present invention.
Figure 7D:
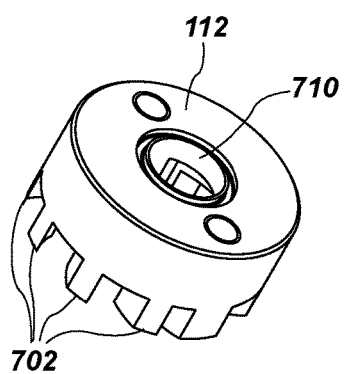
Figure 7E:
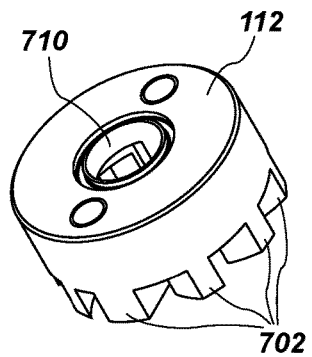
Figure 7B:
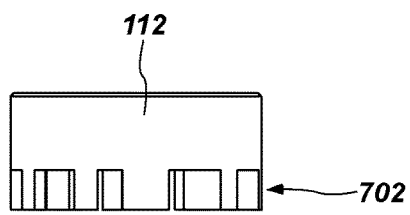
Figure 7F:
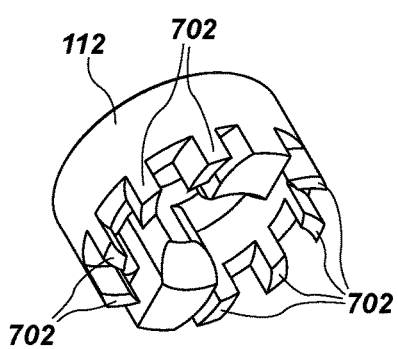
Figure 7G:
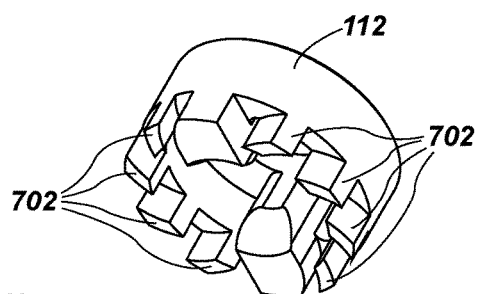
Figure 7C:
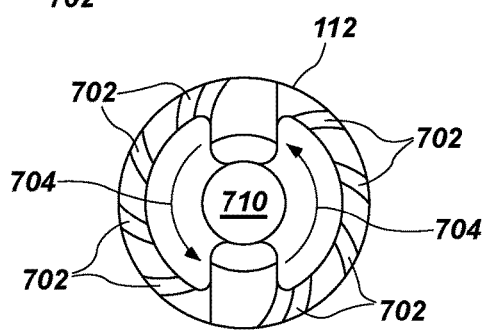

As best shown in FIG. 7C, water flowing from outside or above the blades 702 will be channeled between the blades 702 and flowing into the tap inlet 710 in a swirling counterclockwise vortex 704. It will be understood that the blades 702 could also be oriented in the opposite direction to achieve a swirling clockwise vortex in yet another embodiment (not shown). The direction of vortex rotation is not important. This swirling vortex 704 of pressurized water reduces the incidence of water freezing at the water inlet port 110 and tap inlet 710. The potential problem of water freezing at the water inlet port 110 and tap inlet 710 will generally reduce the volume of water flowing into the dual auto hydrant 100, thereby reducing the efficiency of snowmaking production. This bladed water inlet tap 112, 702 "feature" that creates a swirling vortex 704 is believed to be unique in the industry.

Figures 8, 9:
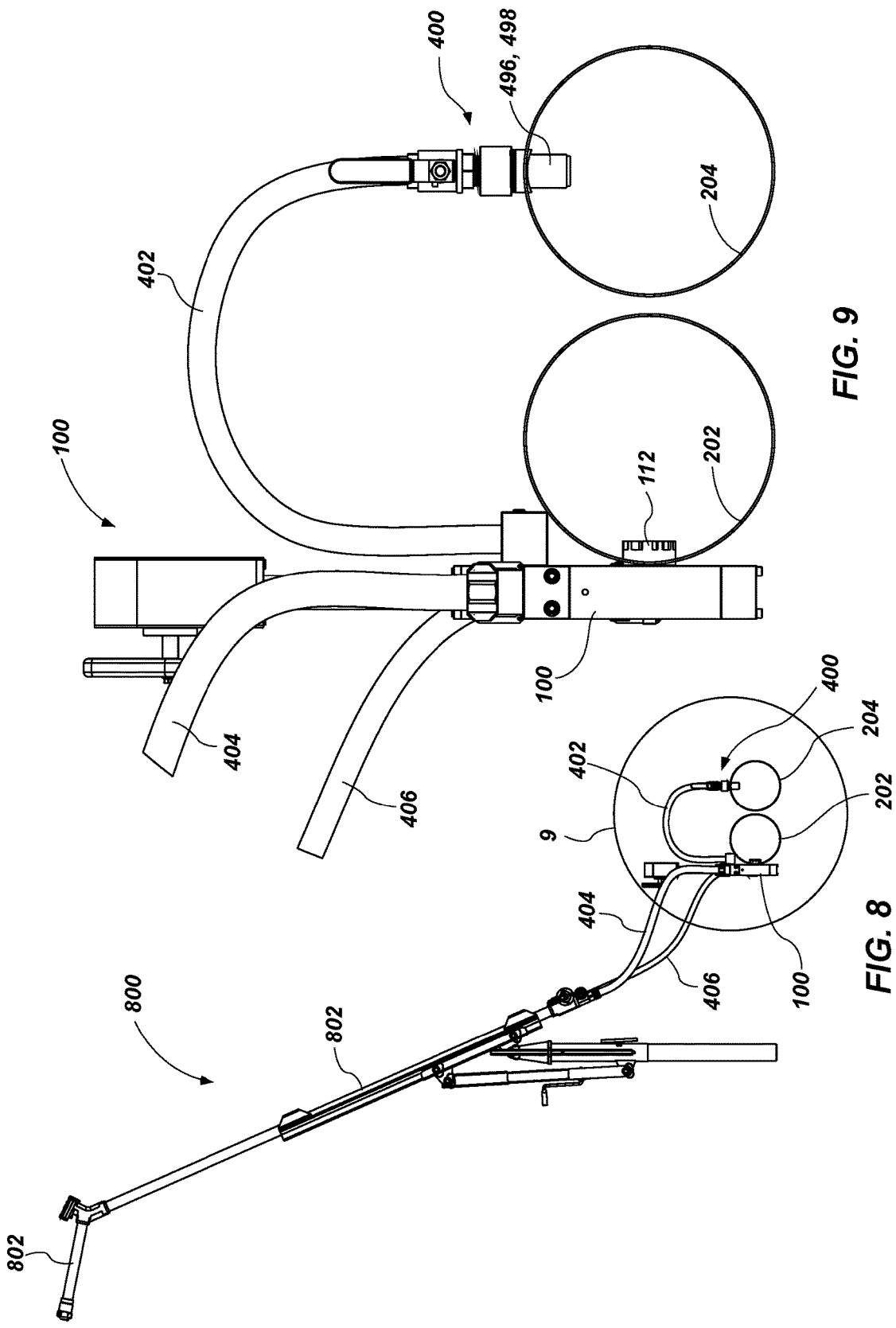
FIG. 8 is a diagram of a complete snowmaking system including gun, dual auto hydrant, water source and compressed air sources according to the present invention.
FIG. 9 is a detail diagram illustrating the interfaces to the water source and compressed air sources as indicated in FIG. 8 according to the present invention.

FIG. 8 is a diagram of a complete snowmaking system 800 including snowmaking gun 802, dual auto hydrant 100, water source 202 and compressed air source 204. FIG. 8 further illustrates additional components of a functional snowmaking system 800 including, compressed air source hose 402, compressed air delivery hose, 404 and pressurized water delivery hose 406, all of which may be required to interface the dual auto hydrant to its sources of air 204 and water 202 as well as the snowmaking gun 802.

Figure 10:
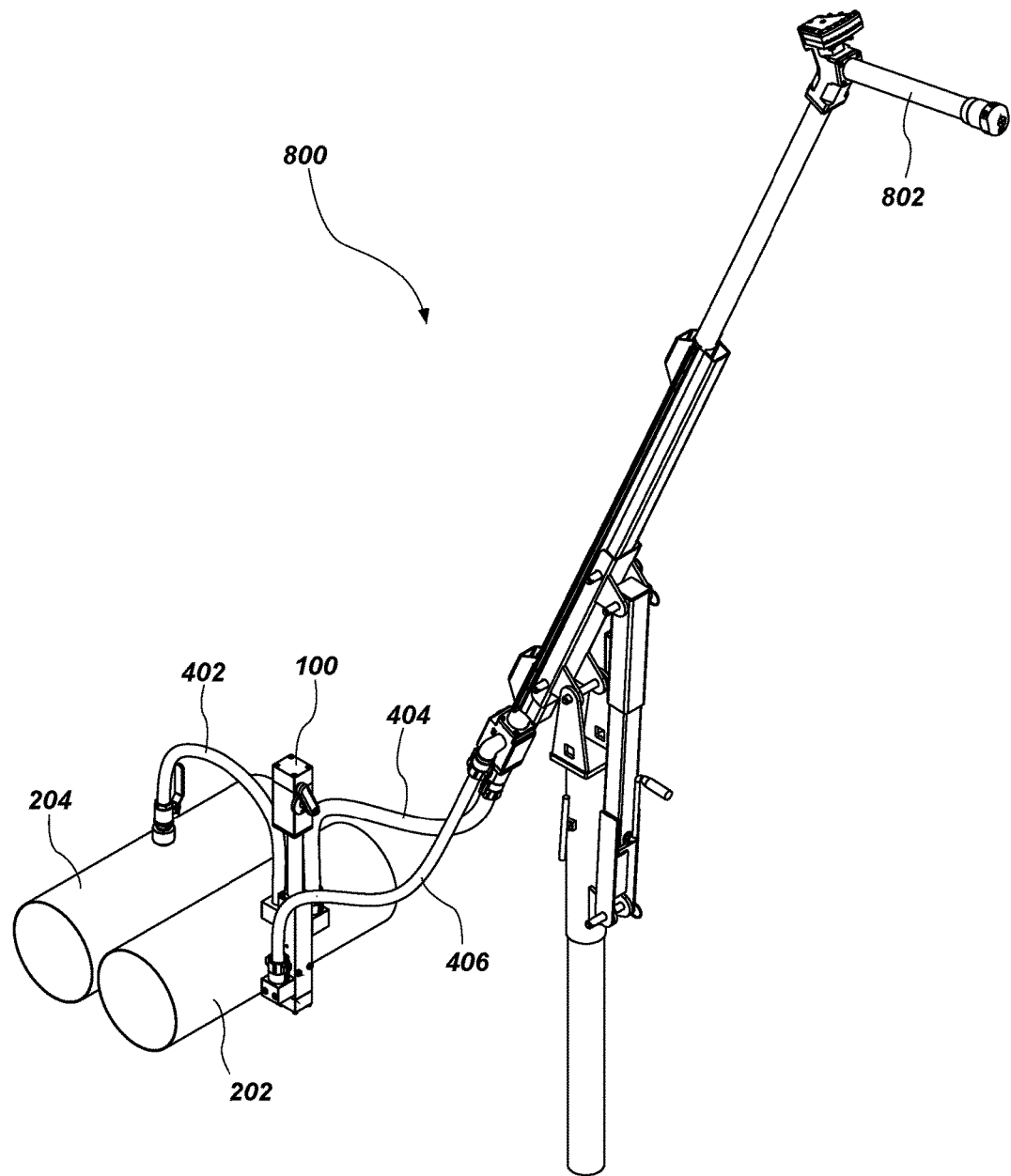
FIG. 10 is a perspective diagram of the complete snowmaking system shown in FIG. 8 according to the present invention.

FIG. 9 is a detail diagram illustrating the interfaces to the water source 202 and compressed air source 204 as indicated in FIG. 8, but in magnification for greater detail. FIG. 9 illustrates two useful features of the snowmaking system 800 and exemplary locations of such features relative to other components in the snowmaking system 800. The first feature is the water pipeline tap 112 which is shown interfacing the dual auto hydrant 100 to the water source 202, where water source 202 may be a water pipeline according to one embodiment. Water pipeline tap 112 and its features were discussed in detail above with respect to FIGS. 7A-7G. The second feature is a moisture separating mechanism 400 interfacing a compressed air source hose 402 to the compressed air source 204, which may be a compressed air pipeline, according to one embodiment. The moisture separating mechanism 400 is discussed in greater detail below with respect to FIGS. 11-13. FIG. 10 is a perspective view of the complete snowmaking system 800 shown in FIG. 8.

Figure 13:
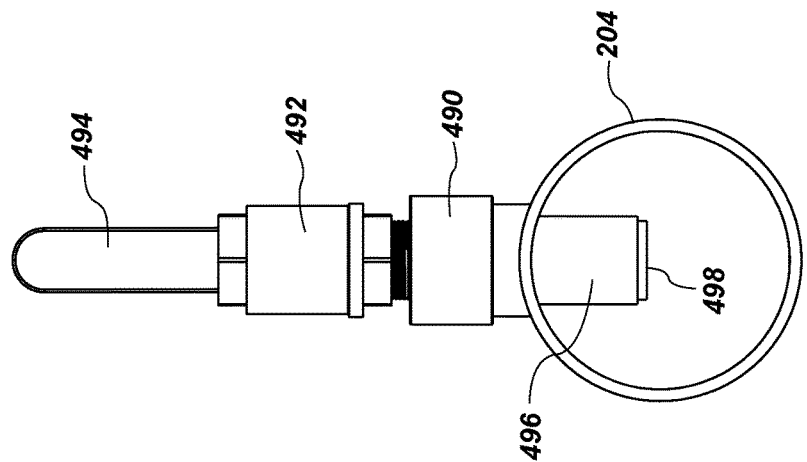
FIG. 13 is a transverse or pipeline axis view of the air hose pipeline fixture shown in FIGS. 11 and 12 according to the present invention.
Figure 12:
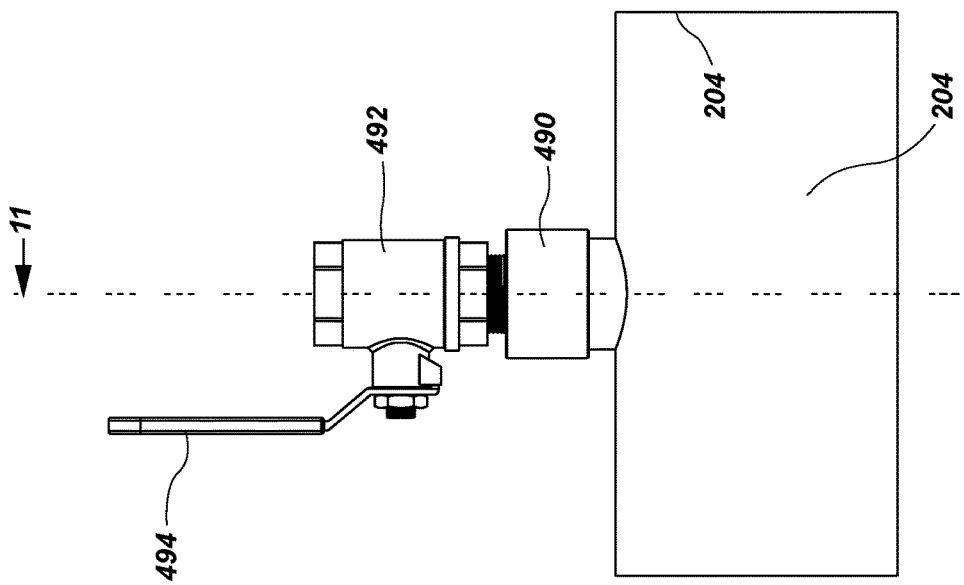
FIG. 12 is a side view of a particular embodiment of an air hose pipeline fixture with moisture separating filter attached to a compressed air pipeline according to the present invention.
Figure 11:
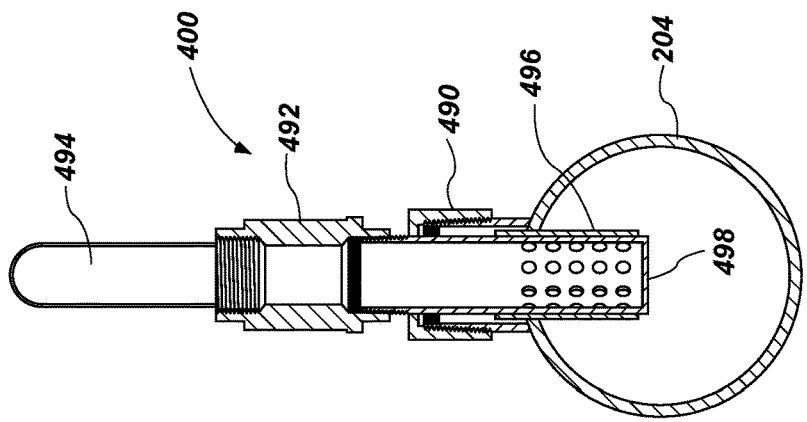
FIG. 11 is a section view as indicated in FIG. 12 of a particular embodiment of an air hose pipeline fixture with moisture separating filter attached to a compressed air pipeline according to the present invention.

FIG. 11 is a section view as indicated in FIG. 12 of a particular embodiment of an air hose pipeline fixture 400 (see e.g., 208 FIG. 2 for a general embodiment) with moisture separating filter 496, 498 attached to a compressed air pipeline 204 according to the present invention. FIG. 12 is a side view of a particular embodiment of the air hose pipeline fixture 400 with moisture separating filter 496, 498 attached to a compressed air pipeline 204 according to the present invention. FIG. 13 is a transverse or pipeline axis view of the air hose pipeline fixture shown in FIGS. 11 and 12.

As shown in FIGS. 11-13, the moisture separator mechanism 400 may include a compressed air tap 490 affixed to the compressed air pipeline 204. Mechanism 400 may further include a filter body 498 holding a filter element 496 to which an isolation valve 492 is connected. Isolation valve 492 may be actuated by isolation valve lever 494. The purpose of the filter element 496 is to separate any water vapor that may be in the compressed air pipeline 204 and keep it away from entering the compressed air hose (206 FIG. 2, or 402 FIGS. 8-10) and into the compressed air channel 320 (e.g., FIGS. 3A-3C) of the hydrant 100 and other air only chambers within the snowmaking gun. Filter element 496 may be formed of any suitable hydrophobic material. For example and not by way of limitation, filter element 496 may be formed of sintered polyethylene material.

Figure 14:
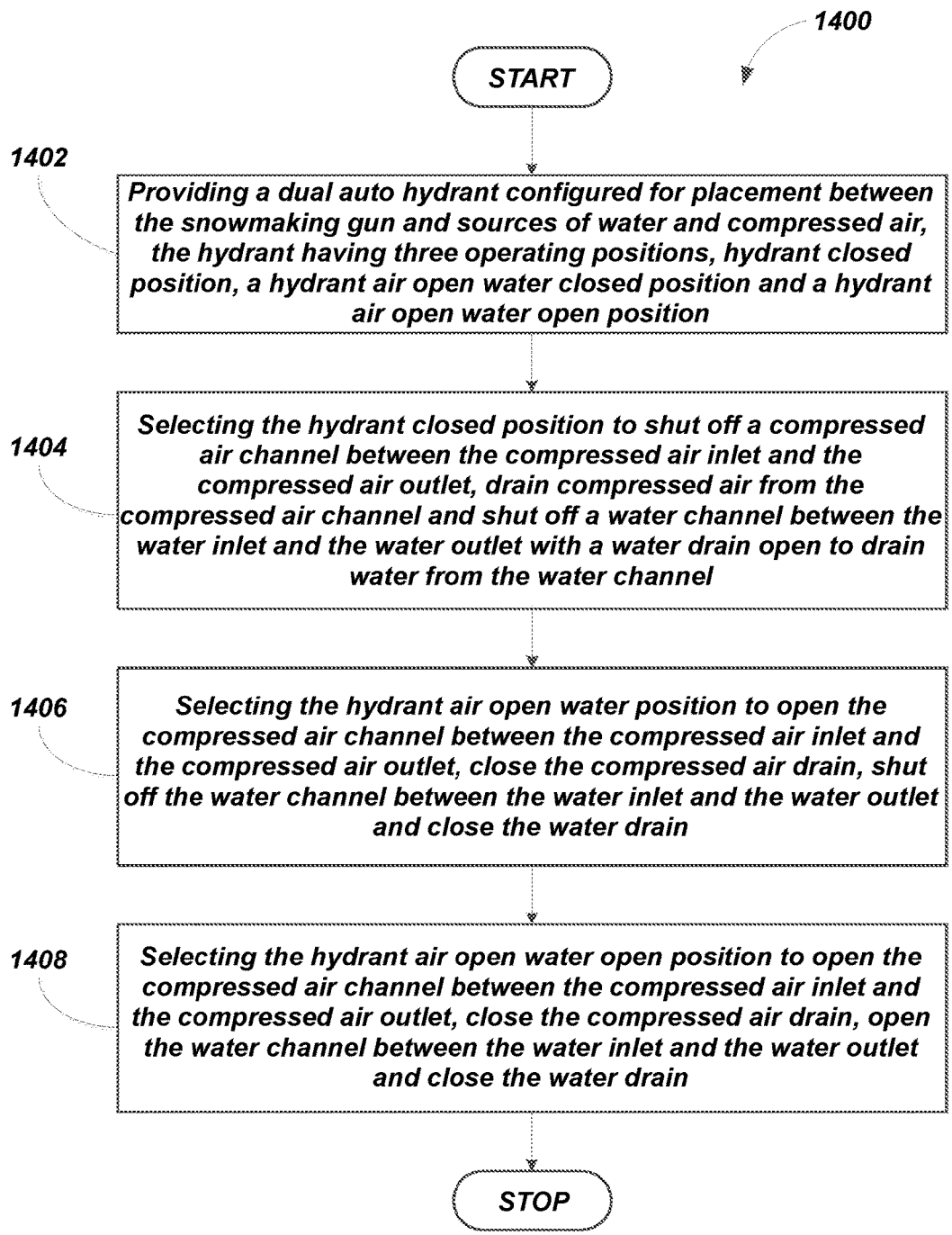
FIG. 14 is a flow chart of an embodiment of a method for selectively providing water and compressed air to a snowmaking gun, according to the present invention.

FIG. 14 is a flow chart of an embodiment of a method 1400 for selectively providing water and compressed air to a snowmaking gun. Method 1400 may include the step of providing 1402 a dual auto hydrant configured for placement between the snowmaking gun and sources of water and compressed air, the hydrant having three operating positions, a hydrant closed position, a hydrant air open water closed position and a hydrant air open water open position. Method 1400 may further include the step of selecting 1404 the hydrant closed position to shut off a compressed air channel between the compressed air inlet and the compressed air outlet, drain compressed air from the compressed air channel and shut off a water channel between the water inlet and the water outlet with a water drain open to drain water from the water channel. Method 1400 may further include the step of selecting 1406 the hydrant air open water closed position to open the compressed air channel between the compressed air inlet and the compressed air outlet, close the compressed air drain, shut off the water channel between the water inlet and the water outlet and close the water drain. Method 1400 may further include the step of selecting 1408 the hydrant air open water open position to open the compressed air channel between the compressed air inlet and the compressed air outlet, close the compressed air drain, open the water channel between the water inlet and the water outlet and close the water drain.

Having reviewed the specific embodiments shown in the drawings, additional more general embodiments of the dual auto hydrant will now be described. An embodiment of a dual auto hydrant for selectively supplying compressed air and water to a snowmaking gun is disclosed. The embodiment of a hydrant may include a hydrant base having an outer surface with a bottom end and a top end, a cylinder oriented along an axis from the bottom end to the top end. The embodiment of a hydrant base may further include a water inlet port passing between the outer surface and the cylinder. The embodiment of a hydrant base may further include a water outlet port passing between the outer surface and the cylinder. The embodiment of a hydrant base may further include a compressed air inlet port passing between the outer surface and the cylinder. The embodiment of a hydrant base may further include a compressed air outlet port passing between the outer surface and the cylinder. The embodiment of a hydrant base may further include a compressed air drain passing between the outer surface and the cylinder. The embodiment of a dual auto hydrant may further include a piston having a distal end and proximal end, the piston passing through the cylinder, the piston further comprising a plurality of seals formed circumferentially around the piston at selected locations along a length of the piston. The embodiment of a dual auto hydrant may further include a controller housing coupled to the hydrant base. The embodiment of a dual auto hydrant may further include a rack and pinion mechanism disposed inside the controller housing and coupled to the proximal end of the piston. The embodiment of a dual auto hydrant may further include a hydrant control lever coupled to the rack and pinion mechanism to selectively drive the piston to any one of three operating positions, hydrant closed position, hydrant air open water closed position and hydrant air open water open position, in that order or reverse order.

Another yet embodiment of dual auto hydrant may further include a control rod housing connected between the hydrant base top end and the controller housing. the embodiment of dual auto hydrant may further include a control rod having a first end and a second end, the control rod configured for extending through the control rod housing along the axis, the first end coupled to the rack and pinion mechanism and the second end coupled to the proximal end of the piston.

Another still embodiment of dual auto hydrant may further include a hydrant control lever for directly driving a pinion gear in the rack and pinion mechanism and thereby controlling axial motion of the piston in the cylinder.

According to a further embodiment of dual auto hydrant, the hydrant closed position has no open air channel between the compressed air inlet and the compressed air outlet with the compressed air drain open and further has no open water channel between the water inlet and the water outlet with a water drain open between the distal end of the piston and the bottom end of the hydrant base.

According to yet still another embodiment of dual auto hydrant, the hydrant air open water closed position may be an open air channel between the compressed air inlet and the compressed air outlet with the compressed air drain closed and further includes no open water channel between the water inlet and the water outlet with a water drain closed between the distal end of the piston and the bottom end of the hydrant base.

According to another embodiment of dual auto hydrant, the hydrant air open water open position includes an open air channel between the compressed air inlet and the compressed air outlet with the compressed air drain closed and further includes an open water channel between the water inlet and the water outlet with a water drain closed between the distal end of the piston and the bottom end of the hydrant base.

Another embodiment of dual auto hydrant may further include a water pipeline tap configured for placement between a cylindrical water pipeline and the water inlet port, the tap cylindrical in shape with a bore passing through a cylindrical axis from a flat hydrant mounting surface end and a plurality of fixed turbine intake blades extending from the flat hydrant mounting surface end to a pipeline end, the blades configured to swirl incoming water from the water pipeline into a rotational vortex upon entering the hydrant to help prevent water freezing at the water inlet.

Another embodiment of dual auto hydrant may further include a control rod housing disposed between the hydrant base and the controller housing, the control rod housing enclosing a control rod coupled at a first end to a rack in the rack and pinion mechanism and a second end of the control rod coupled to the proximal end of the piston.

According to yet another embodiment of dual auto hydrant, the piston may further include a piston rod having threaded proximal and distal ends. According to yet another embodiment the piston may further include a compressed air inlet stack located adjacent to the threaded proximal end surrounding the piston rod, the air inlet stack having first and second O-ring seals separated a distance, a, from one another and configured for sealing against the cylinder. According to yet another embodiment the piston may further include a compressed air drain stack also surrounding the piston rod, the air drain stack having a third O-ring seal separated a distance, c, from the second O-ring seal and configured for sealing against the cylinder. According to yet another embodiment the piston may further include a water inlet stack also surrounding the piston rod, the water inlet stack having fourth and fifth O-ring seals separated by a distance, b, the fourth O-ring seal located a distance, d, from the third O-ring seal, the fourth and fifth O-ring seals configured for sealing against the cylinder. According to yet another embodiment the piston may further include a water drain stack also surrounding the piston rod, the water drain stack having a sixth O-ring seal separated a distance, e, from the fifth O-ring seal.

According to another embodiment of the piston of the dual auto hydrant, the distance, b, is greater than the distance, a, thereby allowing air to be delivered to, or removed from, the hydrant while the water remains turned off.

In understanding the scope of the present invention, the term "configured" as used herein to describe a component, section or part of a device may include hardware and/or software that is constructed and/or programmed to carry out the desired function if appropriate in the given context. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "top, bottom, right, left, forward, rearward, above, downward, vertical, horizontal, below and transverse" as well as any other similar directional terms refer to those directions relative to a properly installed dual auto hydrant, or one or more of its components as shown in the drawing and according to the present invention. Finally, terms of degree such as "substantially", "about" and "approximately" as used herein mean a reasonable amount of deviation of the modified term such that the end result is not significantly changed.

It will further be understood that the present invention may suitably comprise, consist of, or consist essentially of the component parts, method steps and limitations disclosed herein. However, the invention illustratively disclosed herein suitably may be practiced in the absence of any element which is not specifically disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A dual auto hydrant for selectively supplying compressed air and water to a snowmaking gun, the dual auto hydrant comprising:
   a hydrant base having an outer surface with a bottom end and a top end, a cylinder oriented along an axis from the bottom end to the top end,
   a piston having a distal end and proximal end, the piston passing through the cylinder, the piston further comprising a plurality of seals formed circumferentially around the piston at selected locations along a length of the piston; and
   a means for selectively driving the piston to any one of three operating positions, hydrant closed position, hydrant air open water closed position and hydrant air open water open position, in that order or reverse order.

2. The dual auto hydrant according to claim 1, wherein the hydrant base further comprises:
   a water inlet port passing between the outer surface and the cylinder;
   a water outlet port passing between the outer surface and the cylinder;
   a compressed air inlet port passing between the outer surface and the cylinder
   a compressed air outlet port passing between the outer surface and the cylinder; and
   a compressed air drain passing between the outer surface and the cylinder.

3. The dual auto hydrant according to claim 2, wherein the hydrant closed position comprises no open air channel between the compressed air inlet and the compressed air outlet with the compressed air drain open and further comprises no open water channel between the water inlet and the water outlet with a water drain open between the distal end of the piston and the bottom end of the hydrant base.

4. The dual auto hydrant according to claim 2, wherein the hydrant air open water closed position comprises an open air channel between the compressed air inlet and the compressed air outlet with the compressed air drain closed and further comprises no open water channel between the water inlet and the water outlet with a water drain closed between the distal end of the piston and the bottom end of the hydrant base.

5. The dual auto hydrant according to claim 2, wherein the hydrant air open water open position comprises an open air channel between the compressed air inlet and the compressed air outlet with the compressed air drain closed and further comprises an open water channel between the water inlet and the water outlet with a water drain closed between the distal end of the piston and the bottom end of the hydrant base.

6. The dual auto hydrant according to claim 2, further comprising a water pipeline tap configured for placement between a cylindrical water pipeline and the water inlet port, the tap cylindrical in shape with a bore passing through a cylindrical axis from a flat hydrant mounting surface end and a plurality of fixed turbine intake blades extending from the flat hydrant mounting surface end to a pipeline end, the blades configured to swirl incoming water from the water pipeline into a rotational vortex upon entering the hydrant to help prevent water freezing at the water inlet.

7. The dual auto hydrant according to claim 1, wherein the means for selectively driving the piston further comprises:
a controller housing coupled to the hydrant base;
a rack and pinion mechanism disposed inside the controller housing and coupled to the proximal end of the piston; and
a hydrant control lever coupled to the rack and pinion mechanism to selectively drive the piston to any one of the three operating positions.

8. The dual auto hydrant according to claim 7, further comprising:
a control rod housing connected between the hydrant base top end and the controller housing; and
a control rod having a first end and a second end, the control rod configured for extending through the control rod housing along the axis, the first end coupled to the rack and pinion mechanism and the second end coupled to the proximal end of the piston.

9. The dual auto hydrant according to claim 7, further comprising a control rod housing disposed between the hydrant base and the controller housing, the control rod housing enclosing a control rod coupled at a first end to a rack in the rack and pinion mechanism and a second end of the control rod coupled to the proximal end of the piston.

10. The dual auto hydrant according to claim 1, wherein the piston further comprises:
a piston rod having threaded proximal and distal ends;
a compressed air inlet stack located adjacent to the threaded proximal end surrounding the piston rod, the air inlet stack having first and second O-ring seals separated a distance, a, from one another and configured for sealing against the cylinder;
a compressed air drain stack also surrounding the piston rod, the air drain stack having a third O-ring seal separated a distance, c, from the second O-ring seal and configured for sealing against the cylinder;
a water inlet stack also surrounding the piston rod, the water inlet stack having fourth and fifth O-ring seals separated by a distance, b, the fourth O-ring seal located a distance, d, from the third O-ring seal, the fourth and fifth O-ring seals configured for sealing against the cylinder; and
a water drain stack also surrounding the piston rod, the water drain stack having a sixth O-ring seal separated a distance, e, from the fifth O-ring seal.

11. The dual auto hydrant according to claim 10, wherein the distance, b, is greater than the distance, a, thereby allowing air to be delivered to, or removed from, the hydrant while the water remains turned off.

12. A method for selectively providing water and compressed air to a snowmaking gun, the method comprising the steps of:
providing a dual auto hydrant configured for placement between the snowmaking gun and sources of water and compressed air, the hydrant further comprising:
a hydrant base having an outer surface with a bottom end and a top end, a cylinder oriented along an axis from the bottom end to the top end,
a piston having a distal end and proximal end, the piston passing through the cylinder, the piston further comprising a plurality of seals formed circumferentially around the piston at selected locations along a length of the piston; and
a means for selectively driving the piston to any one of three operating positions, hydrant closed position, hydrant air open water closed position and hydrant air open water open position, in that order or reverse order;
selecting the hydrant closed position to shut off a compressed air channel between the compressed air inlet and the compressed air outlet, drain compressed air from the compressed air channel and shut off a water channel between the water inlet and the water outlet with a water drain open to drain water from the water channel;
selecting the hydrant air open water closed position to open the compressed air channel between the compressed air inlet and the compressed air outlet, close the compressed air drain, shut off the water channel between the water inlet and the water outlet and close the water drain; and
selecting the hydrant air open water open position to open the compressed air channel between the compressed air inlet and the compressed air outlet, close the compressed air drain, open the water channel between the water inlet and the water outlet and close the water drain.

13. The method according to claim 12, wherein the hydrant base further comprises:
a water inlet port passing between the outer surface and the cylinder;
a water outlet port passing between the outer surface and the cylinder;
a compressed air inlet port passing between the outer surface and the cylinder
a compressed air outlet port passing between the outer surface and the cylinder; and
a compressed air drain passing between the outer surface and the cylinder.

14. The method according to claim 13, wherein the hydrant closed position comprises no open air channel between the compressed air inlet and the compressed air outlet with the compressed air drain open and further comprises no open water channel between the water inlet and the water outlet with a water drain open between the distal end of the piston and the bottom end of the hydrant base.

15. The method according to claim 13, wherein the hydrant air open water closed position comprises an open air channel between the compressed air inlet and the compressed air outlet with the compressed air drain closed and further comprises no open water channel between the water inlet and the water outlet with a water drain closed between the distal end of the piston and the bottom end of the hydrant base.

16. The method according to claim 13, wherein the hydrant air open water open position comprises an open air channel between the compressed air inlet and the compressed air outlet with the compressed air drain closed and further comprises an open water channel between the water inlet and the water outlet with a water drain closed between the distal end of the piston and the bottom end of the hydrant base.

17. The method according to claim 13, wherein the step of providing a dual auto hydrant further comprises a water pipeline tap configured for placement between a cylindrical water pipeline and the water inlet port, the tap cylindrical in shape with a bore passing through a cylindrical axis from a flat hydrant mounting surface end and a plurality of fixed turbine intake blades extending from the flat hydrant mounting surface end to a pipeline end, the blades configured to swirl incoming water from the water pipeline into a rotational vortex upon entering the hydrant to help prevent water freezing at the water inlet.

18. The method according to claim 12, wherein the means for selectively driving the piston further comprises:
   a controller housing coupled to the hydrant base;
   a rack and pinion mechanism disposed inside the controller housing and coupled to the proximal end of the piston; and
   a hydrant control lever coupled to the rack and pinion mechanism to selectively drive the piston to any one of the three operating positions.

19. The method according to claim 14, wherein the means for selectively driving the piston further comprises:
   a control rod housing connected between the hydrant base top end and the controller housing; and
   a control rod having a first end and a second end, the control rod configured for extending through the control rod housing along the axis, the first end coupled to the rack and pinion mechanism and the second end coupled to the proximal end of the piston.

20. The method according to claim 12, wherein the piston further comprises:
   a piston rod having threaded proximal and distal ends;
   a compressed air inlet stack located adjacent to the threaded proximal end surrounding the piston rod, the air inlet stack having first and second O-ring seals separated a distance, a, from one another and configured for sealing against the cylinder;
   a compressed air drain stack also surrounding the piston rod, the air drain stack having a third O-ring seal separated a distance, c, from the second O-ring seal and configured for sealing against the cylinder;
   a water inlet stack also surrounding the piston rod, the water inlet stack having fourth and fifth O-ring seals separated by a distance, b, the fourth O-ring seal located a distance, d, from the third O-ring seal, the fourth and fifth O-ring seals configured for sealing against the cylinder; and
   a water drain stack also surrounding the piston rod, the water drain stack having a sixth O-ring seal separated a distance, e, from the fifth O-ring seal.

* * * * *